(12) United States Patent
Mattox

(10) Patent No.: US 8,996,468 B1
(45) Date of Patent: Mar. 31, 2015

(54) BLOCK STATUS MAPPING SYSTEM FOR REDUCING VIRTUAL MACHINE BACKUP STORAGE

(75) Inventor: Jason Mattox, Spring Grove, IL (US)

(73) Assignee: Dell Software Inc., Aliso Viejo, CA (US)

( * ) Notice: Subject to any disclaimer, the term of this patent is extended or adjusted under 35 U.S.C. 154(b) by 140 days.

(21) Appl. No.: 12/762,162

(22) Filed: Apr. 16, 2010

Related U.S. Application Data

(60) Provisional application No. 61/170,520, filed on Apr. 17, 2009.

(51) Int. Cl.
*G06F 17/30* (2006.01)

(52) U.S. Cl.
USPC .......................................................... 707/650

(58) Field of Classification Search
CPC .......................... G06F 11/1469; G06F 11/1484
USPC .......................................................... 707/650
See application file for complete search history.

(56) References Cited

U.S. PATENT DOCUMENTS

| | | | |
|---|---|---|---|
| 4,130,867 A | 12/1978 | Bachman et al. |
| 4,648,031 A | 3/1987 | Jenner |
| 4,665,520 A | 5/1987 | Strom et al. |
| 5,222,235 A | 6/1993 | Hintz et al. |
| 5,297,279 A | 3/1994 | Bannon et al. |
| 5,325,505 A | 6/1994 | Hoffecker et al. |
| 5,333,314 A | 7/1994 | Masai et al. |
| 5,414,650 A | 5/1995 | Hekhuis |
| 5,422,979 A | 6/1995 | Eichfeld et al. |
| 5,423,037 A | 6/1995 | Hvasshovd |
| 5,455,945 A | 10/1995 | VanderDrift |
| 5,530,855 A | 6/1996 | Satoh et al. |
| 5,551,020 A | 8/1996 | Flax et al. |
| 5,553,303 A | 9/1996 | Hayashi et al. |
| 5,596,747 A | 1/1997 | Katabami et al. |
| 5,634,052 A | 5/1997 | Morris |
| 5,640,561 A | 6/1997 | Satoh et al. |
| 5,655,081 A | 8/1997 | Bonnell et al. |
| 5,664,186 A | 9/1997 | Bennett |
| 5,721,915 A | 2/1998 | Sockut et al. |
| 5,758,356 A | 5/1998 | Hara et al. |
| 5,761,667 A | 6/1998 | Koeppen |
| 5,761,677 A | 6/1998 | Senator et al. |
| 5,774,717 A | 6/1998 | Porcaro |

(Continued)

OTHER PUBLICATIONS

"Data Deduplication Deep Dive, How to Put Data Storage on a Diet", InfoWorld, Mar. 2010, in 5 pages.

(Continued)

*Primary Examiner* — Cheryl Lewis
*Assistant Examiner* — Alexander Khong
(74) *Attorney, Agent, or Firm* — Winstead PC

(57) ABSTRACT

Systems and methods programmatically determine the status of blocks in a virtual machine image. In certain embodiments, the system can determine which blocks are active, deleted, zero, or a combination of the same. In certain embodiments, the system advantageously determines block status without scanning all the blocks in a virtual machine image. Instead, the system can access metadata in a file system of a virtual machine image to determine the block status. When backing up the virtual machine image, the system can back up active blocks while skipping inactive blocks, including deleted and/or zero blocks. As a result, the system can take less time to back up a virtual machine image, and the resulting backup file or files can consume less storage space.

20 Claims, 6 Drawing Sheets

(56) References Cited

U.S. PATENT DOCUMENTS

| | | |
|---|---|---|
| 5,778,377 A | 7/1998 | Marlin et al. |
| 5,778,392 A | 7/1998 | Stockman et al. |
| 5,796,934 A | 8/1998 | Bhanot et al. |
| 5,799,322 A | 8/1998 | Mosher, Jr. |
| 5,822,780 A | 10/1998 | Schutzman |
| 5,848,416 A | 12/1998 | Tikkanen |
| 5,893,924 A | 4/1999 | Bahls et al. |
| 5,933,818 A | 8/1999 | Kasravi et al. |
| 5,933,820 A | 8/1999 | Beier et al. |
| 5,940,832 A | 8/1999 | Hamada et al. |
| 5,943,677 A | 8/1999 | Hicks |
| 5,948,108 A | 9/1999 | Lu et al. |
| 5,951,694 A | 9/1999 | Choquier et al. |
| 5,951,695 A | 9/1999 | Kolovson |
| 5,956,489 A | 9/1999 | San Andres et al. |
| 5,956,504 A | 9/1999 | Jagadish et al. |
| 5,978,594 A | 11/1999 | Bonnell et al. |
| 5,983,239 A | 11/1999 | Cannon |
| 5,990,810 A | 11/1999 | Williams |
| 5,991,761 A | 11/1999 | Mahoney et al. |
| 5,995,958 A | 11/1999 | Xu |
| 6,003,022 A | 12/1999 | Eberhard et al. |
| 6,016,497 A | 1/2000 | Suver |
| 6,026,412 A | 2/2000 | Sockut et al. |
| 6,029,195 A | 2/2000 | Herz |
| 6,067,410 A | 5/2000 | Nachenberg |
| 6,067,545 A | 5/2000 | Wolff |
| 6,070,170 A | 5/2000 | Friske et al. |
| 6,119,128 A | 9/2000 | Courter et al. |
| 6,122,640 A | 9/2000 | Pereira |
| 6,151,607 A | 11/2000 | Lomet |
| 6,157,932 A | 12/2000 | Klein et al. |
| 6,185,699 B1 | 2/2001 | Haderle et al. |
| 6,243,715 B1 | 6/2001 | Bogantz et al. |
| 6,253,212 B1 | 6/2001 | Loaiza et al. |
| 6,289,357 B1 | 9/2001 | Parker |
| 6,314,421 B1 | 11/2001 | Sharnoff et al. |
| 6,343,296 B1 | 1/2002 | Lakhamraju et al. |
| 6,363,387 B1 | 3/2002 | Ponnekanti et al. |
| 6,411,964 B1 | 6/2002 | Iyer et al. |
| 6,460,048 B1 | 10/2002 | Teng et al. |
| 6,470,344 B1 | 10/2002 | Kothuri et al. |
| 6,477,535 B1 | 11/2002 | Mirzadeh |
| 6,499,039 B1 | 12/2002 | Venkatesh et al. |
| 6,519,613 B1 | 2/2003 | Friske et al. |
| 6,523,035 B1 | 2/2003 | Fleming et al. |
| 6,584,474 B1 | 6/2003 | Pereira |
| 6,606,626 B1 | 8/2003 | Ponnekanti |
| 6,631,478 B1 | 10/2003 | Wang et al. |
| 6,671,721 B1 | 12/2003 | Branson et al. |
| 6,681,386 B1 | 1/2004 | Amin et al. |
| 6,691,139 B2 | 2/2004 | Ganesh et al. |
| 6,721,742 B1 | 4/2004 | Uceda-Sosa et al. |
| 6,728,780 B1 | 4/2004 | Hebert |
| 6,834,290 B1 | 12/2004 | Pugh et al. |
| 6,859,889 B2 | 2/2005 | Matsuura et al. |
| 6,907,512 B2 | 6/2005 | Hill et al. |
| 6,950,834 B2 | 9/2005 | Huras et al. |
| 6,959,441 B2 | 10/2005 | Moore |
| 7,065,538 B2 | 6/2006 | Aronoff et al. |
| 7,085,900 B2 | 8/2006 | Inagaki et al. |
| 7,093,086 B1 | 8/2006 | van Rietschote |
| 7,340,486 B1 | 3/2008 | Chapman |
| 7,370,164 B1 | 5/2008 | Nagarkar et al. |
| 7,447,854 B1 | 11/2008 | Cannon |
| 7,461,103 B2 | 12/2008 | Aronoff et al. |
| 7,546,325 B2 | 6/2009 | Kamei et al. |
| 7,610,331 B1 | 10/2009 | Genske et al. |
| 7,657,581 B2 | 2/2010 | Orenstein et al. |
| 7,669,020 B1 * | 2/2010 | Shah et al. ............. 711/162 |
| 7,707,185 B1 | 4/2010 | Czezatke et al. |
| 7,752,487 B1 | 7/2010 | Feeser et al. |
| 7,765,400 B2 | 7/2010 | Costea et al. |
| 7,769,722 B1 | 8/2010 | Bergant et al. |
| 7,805,423 B1 | 9/2010 | Romine et al. |
| 7,844,577 B2 | 11/2010 | Becker et al. |
| 7,849,267 B2 | 12/2010 | Lam et al. |
| 7,895,161 B2 | 2/2011 | Sugimoto et al. |
| 7,925,850 B1 | 4/2011 | Waldspurger et al. |
| 1,016,129 A1 | 6/2011 | Vengerov et al. |
| 8,001,596 B2 | 8/2011 | Wollnik et al. |
| 8,010,495 B1 | 8/2011 | Kuznetzov et al. |
| 8,046,550 B2 | 10/2011 | Feathergill |
| 8,060,476 B1 | 11/2011 | Afonso et al. |
| 8,135,930 B1 | 3/2012 | Mattox et al. |
| 8,166,265 B1 | 4/2012 | Feathergill |
| 8,250,033 B1 | 8/2012 | De Souter et al. |
| 8,286,019 B2 | 10/2012 | Murase |
| 8,335,902 B1 | 12/2012 | Feathergill |
| 8,412,848 B2 | 4/2013 | Therrien et al. |
| 8,464,214 B2 | 6/2013 | Miloushev et al. |
| 8,627,198 B2 | 1/2014 | Martinsen et al. |
| 2003/0145074 A1 | 7/2003 | Penick |
| 2004/0024961 A1 | 2/2004 | Cochran et al. |
| 2004/0030822 A1 | 2/2004 | Rajan et al. |
| 2004/0236803 A1 | 11/2004 | Spiegeleer |
| 2005/0114614 A1 | 5/2005 | Anderson et al. |
| 2005/0278280 A1 | 12/2005 | Semerdzhiev et al. |
| 2006/0005189 A1 | 1/2006 | Vega et al. |
| 2006/0020932 A1 | 1/2006 | Bentz et al. |
| 2006/0143501 A1 | 6/2006 | Tormasov et al. |
| 2006/0155735 A1 | 7/2006 | Traut et al. |
| 2006/0218544 A1 | 9/2006 | Chakraborty et al. |
| 2007/0208918 A1 | 9/2007 | Harbin et al. |
| 2007/0234334 A1 | 10/2007 | Araujo, Jr. et al. |
| 2007/0244938 A1 | 10/2007 | Michael et al. |
| 2008/0082593 A1 | 4/2008 | Komarov et al. |
| 2008/0155208 A1 | 6/2008 | Hiltgen et al. |
| 2008/0177994 A1 | 7/2008 | Mayer |
| 2008/0201414 A1 | 8/2008 | Husain et al. |
| 2008/0244028 A1 | 10/2008 | Le et al. |
| 2008/0244577 A1 | 10/2008 | Le et al. |
| 2008/0250406 A1 | 10/2008 | Carpenter et al. |
| 2009/0007100 A1 | 1/2009 | Field et al. |
| 2009/0089781 A1 | 4/2009 | Shingai et al. |
| 2009/0158432 A1 | 6/2009 | Zheng et al. |
| 2009/0216816 A1 | 8/2009 | Basler et al. |
| 2009/0216970 A1 | 8/2009 | Basler et al. |
| 2009/0240904 A1 | 9/2009 | Austruy et al. |
| 2009/0265403 A1 * | 10/2009 | Fukumoto ............. 707/206 |
| 2009/0300023 A1 | 12/2009 | Vaghani |
| 2010/0030983 A1 | 2/2010 | Gupta et al. |
| 2010/0049930 A1 | 2/2010 | Pershin et al. |
| 2010/0058013 A1 | 3/2010 | Gelson et al. |
| 2010/0070725 A1 | 3/2010 | Prahlad et al. |
| 2010/0076934 A1 | 3/2010 | Pershin et al. |
| 2010/0077165 A1 | 3/2010 | Lu et al. |
| 2010/0088277 A1 | 4/2010 | Rao et al. |
| 2010/0115332 A1 | 5/2010 | Zheng et al. |
| 2010/0122248 A1 | 5/2010 | Robinson et al. |
| 2010/0185587 A1 | 7/2010 | Lovinger |
| 2010/0228913 A1 * | 9/2010 | Czezatke et al. ............. 711/112 |
| 2010/0235813 A1 | 9/2010 | Manczak et al. |
| 2010/0235831 A1 | 9/2010 | Dittmer |
| 2010/0235832 A1 | 9/2010 | Rajagopal et al. |
| 2010/0257331 A1 | 10/2010 | Frank |
| 2010/0262585 A1 | 10/2010 | Rosikiewicz et al. |
| 2010/0262586 A1 | 10/2010 | Rosikiewicz et al. |
| 2010/0262802 A1 * | 10/2010 | Goebel et al. ............. 711/166 |
| 2010/0293140 A1 | 11/2010 | Nishiyama |
| 2010/0306412 A1 | 12/2010 | Therrien et al. |
| 2011/0035358 A1 | 2/2011 | Naik |
| 2011/0047340 A1 | 2/2011 | Olson et al. |
| 2011/0145199 A1 | 6/2011 | Prasad Palagummi |
| 2011/0153697 A1 | 6/2011 | Nickolov et al. |
| 2011/0154325 A1 | 6/2011 | Terasaki |
| 2011/0225122 A1 | 9/2011 | Denuit et al. |
| 2012/0084598 A1 | 4/2012 | Alibakhsh et al. |
| 2012/0109897 A1 | 5/2012 | Janakiraman et al. |
| 2012/0297246 A1 | 11/2012 | Liu et al. |
| 2013/0007506 A1 | 1/2013 | Jain et al. |
| 2013/0014102 A1 | 1/2013 | Shah |

(56) References Cited

U.S. PATENT DOCUMENTS

| | | |
|---|---|---|
| 2013/0097599 A1 | 4/2013 | Konik et al. |
| 2013/0185716 A1 | 7/2013 | YIN et al. |
| 2013/0246685 A1 | 9/2013 | Bhargava et al. |

OTHER PUBLICATIONS

"The What, How and Where of Deduplication", Spectra nTier with FalconStor Deduplication, Spectra Logic Corporation, May 2008, in 12 pages.

"Quest SharePlex for Oracle," Brochure, Quest Software, Inc., Nov. 1999, 4 pages.

Space Management and Reorganization: Challenges and Solutions, http://quest.com/whitepapers/space_manager_wp.doc, published on or around Dec. 21, 1999.

"Top Five Tips for Space Management and Reorganization," believed to be published after Jul. 21, 1998, in 2 pages.

Computer Associates, "Platinum OnlineReorg Technical Overview, OnlineReorg", http://platinum.com/products/custstor/tsreorg.htm, 5 pages downloaded on Nov. 30, 1999.

Computer Associates, "Platinum Tsreorg Automates Tablespace Reorganizations, Customer Story", http://platinum.com/products/custstor/tsreorg.htm, 2 pages downloaded on Nov. 30, 1999.

Computer Associates, "ProVision Tsreorg for Oracle, Brochure, Database Utilities Tsreorg for Oracle", http://platinum.com/products/custstor/tsreorg.htm, 4 pages downloaded on Nov. 30, 1999.

Computer Associates, "Rapid Reorg for DB2 for OS/390, Brochure", http://platinum.com/products/custstor/tsreorg.htm, 3 pages downloaded on Nov. 30, 1999.

EMC Deduplication Frequently Asked Questions, http://www.datadomain.com/resources/faq.html, downloaded Jun. 7, 2011, 4 pages.

Harley Stagner, "Aligning disk partitions to boost virtual machine performance", Vmware Management, Migration and Performance, http://searchvmware.techtarget.com/tip/0,289483,sid179_gci1344730_mem1,00.html, Jan. 28, 2009, pp. 1-5.

Jeff Graves, "Partition Alignment", ORCS Web Team Blog, http://www.orcsweb.com/blog, Sep. 14, 2009, pp. 1-2.

Jin, Keren et al.,"The Effectiveness of Deduplication on Virtual Machine Disk Images", SYSTOR 2009, May 2009, in 12 pages.

John Willemse, "VMware disk alignment VMDK settings and align at the 64k boundary blogSphere bug desktop enterprise microsoft server vist . . . ", Planet Lotus, http://planetlotus.org/profiles/john-willemse_49586, Apr. 30, 2009, pp. 1-5 (of 44).

Joseph Pagano, paper on Microsoft Exchange Disaster Recovery Planning, document version 3.00, 1996, in 39 pages.

K. Loney, et al., "Oracle8i, DB Handbook," Oracle Press, 2000, p. 20.

L. Leverenz, et al., "Oracle8i Concepts," Oracle Corp., vol. 2, Release 8.1.5, 1999, p. 20-3.

Massiglia, Paul, "Block-Level Incremental Backup", Veritas Software Corporation, Feb. 2000, in 13 pages.

Oracle: Introduction to PL/SQL, Power Point Presentation Regarding Triggers, slides 4, 6-7, 11, 14-17, 28, and 51, http://training.ntsource.com/dpec/COURSES/PL1/plc011.htm, 10 pages downloaded on Oct. 20, 2000.

Tom Hirt, "Importance of Disk Alignment in VMware", VMware Disk Alignment—How-to Align VMware Partitions—Disk, Alignment, Vmfs, Vmdk, Esx, Apr. 9, 2009, pp. 1-15.

VMware, "Recommendations for Aligning VMFS Partitions", VMware Infrastructure 3, VMware Performance Study, Feb. 2009, pp. 1-10.

VMware, Inc., "VMware Virtual Machine File System: Technical Overview and Best Practices", A VMware Technical White Paper, http://www.vmware.com/support/, 2007, Issue Version 1.0, pp. 1-19.

Laverick, Mike, "VMware ESX 3.x Server and VirtualCenter 2.x (GA Build Eval) Service Console Guide," Document Ver. 1.2, RTFM Education, downloaded Dec. 17, 2008, in 73 pages.

Kleo Bare Metal Backup, Wikipedia, retrieved from http://en.wikipedia.org/wiki/Kleo_Bare_Metal_Backup on Apr. 14, 2010, in 3 pages.

Veritas NetBackup for VMware Adminstrator's Guide, UNIX, Windows, and Linux, Release 6.5.4, Symantec Corporation, 2009, in 66 pages.

Data Sheet: Data Protection, "Symantec NetBackup 7, The Symantec NetBackup Platform: Complete protection for your information-driven enterprise," Symantec Corporation, Dec. 2009, in 8 pages.

Veeam Technology Overview, "The New Standard for Data Protection," Veeam Software, Apr. 2010, in 2 pages.

Backup Critic, "File Versus Image Backups," retrieved from http://www.backupcritic.com/software-buyer/file-verus-image on May 4, 2010, in 3 pages.

Microsoft TechNet, Windows Server 2003, retrieved from http://technet.microsoft.com/en-us/library/cc706993(WS.10,printer).aspx on Aug. 3, 2011, in 6 pages.

MSDN, Overview of Processing a Backup Under VSS, retrieved from http://msdn.microsoft.com/en-us/library/aa384589(d=printer,v=VS.85).aspx on Aug. 3, 2011, in 5 pages.

U.S. Appl. No. 13/218,362, filed Aug. 25, 2011, titled "Multitier Deduplication Systems and Methods", 50 pages.

Armstrong, Ben, "How Do I Fix a Corrupted Virtual Hard Disk?", Virtual PC Guy's Blog, Jan. 7, 2009, in 4 pages.

Microsoft Corporation Technet, "Compacting Dynamically Expanding Virtual Hard Disks", retrieved Feb. 6, 2012, in 2 pages.

Microsoft Corporation Technet, "To Compact a Dynamically Expanding Virtual Hard Disk", retrieved Feb. 6, 2012, in 1 page.

Microsoft Corporation, "Microsoft Windows XP—Compact", Command-line reference A-Z, retrieved Feb. 6, 2012, in 2 pages.

Naik, Dilip, "Virtual Machine Storage—often overlooked optimizations", 2010 Storage Developer Conference, Storage Networking Industry Association, Sep., 2010, in 21 pages.

Russinovich, Mark, "SDelete v1.6", Windows Sysinternals, published Sep. 1, 2011, in 3 pages.

U.S. Appl. No. 13/368,240, filed Feb. 7, 2012, titled "Systems and Methods for Compacting a Virtual Machine File", in 44 pages.

Afonso, Delano Xavier, U.S. Appl. No. 13/764,011, filed Feb. 11, 2013.

U.S. Appl. No. 13/850,164, filed Mar. 25, 2013, Feathergill.

\* cited by examiner

BLOCK STATUS MAPPING SYSTEM FOR REDUCING VIRTUAL MACHINE BACKUP STORAGE

RELATED APPLICATION

This application claims the benefit of priority under 35 U.S.C. §119(e) of U.S. Provisional Patent Application No. 61/170,520, filed on Apr. 17, 2009, and entitled "Systems and Methods for Mapping Virtual Machine Data," the disclosure of which is hereby incorporated by reference in its entirety.

BACKGROUND

Many companies take advantage of virtualization solutions to consolidate several specialized physical servers and workstations into fewer servers running virtual machines. Each virtual machine can be configured with its own set of virtual hardware (e.g., processor, memory, ports, and the like) such that specialized services that each of the previous physical machines performed can be run in their native operating system. For example, a virtualization layer, or hypervisor, can allocate the computing resources of one or more host servers into one or more virtual machines and can further provide for isolation between such virtual machines. In such a manner, the virtual machine can be a representation of a physical machine by software.

In many virtual machine implementations, each virtual machine is associated with at least one virtual machine disk or image located in one or more files in a data store. The virtual machine image can include files associated with a file system of a guest operating system. The virtual machine image can be copied, moved, backed up, or the like, similar to a general data file.

SUMMARY

In certain embodiments, systems and methods programmatically determine the status of blocks in a virtual machine image. For example, a system can determine which blocks in a virtual machine image are active, deleted, zero, or a combination of the same. The system can determine block status without scanning all the blocks in a virtual machine image in some implementations. Instead, the system can access metadata in a file system of a virtual machine image to determine the block status. When backing up the virtual machine image, the system can back up active blocks while skipping inactive blocks, including deleted and/or zero blocks. As a result, in certain embodiments, the system can take less time to back up a virtual machine image, and the resulting backup file or files can consume less storage space.

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

I. Introduction

Virtual machine images often contain a large percentage of white space, which includes empty blocks (zero blocks). A backup of an entire virtual machine image therefore stores the white space together with any active and deleted blocks, wasting storage space and backup time. Some solutions determine which blocks of a virtual machine image are zero blocks and then back up only the active and deleted blocks. This backup approach is called zero handling. A drawback of zero handling is that a full scan of the blocks is performed to determine which blocks are the zero blocks. The full scan can take a significant amount of time. Another drawback of this approach is that zero handling fails to account for blocks of a file system that are marked as deleted. Thus, even when accounting for zero blocks, a backup system can still back up a significant amount of irrelevant deleted data, which still results in wasted storage space and backup time.

This disclosure describes systems and methods for programmatically determining the status of blocks in a virtual machine image. In certain embodiments, the system can determine which blocks are active, deleted, zero, or a combination of the same. In certain embodiments, the system advantageously determines block status without scanning some or all the blocks in a virtual machine image. Instead, the system can access metadata in a file system of a virtual machine image to determine the block status. When backing up the virtual machine image, the system can back up active blocks while skipping inactive blocks, including deleted and/or zero blocks. As a result, the system can take less time to back up a virtual machine image, and the resulting backup file or files can consume less storage space.

II. Example Backup System

Figure 1:
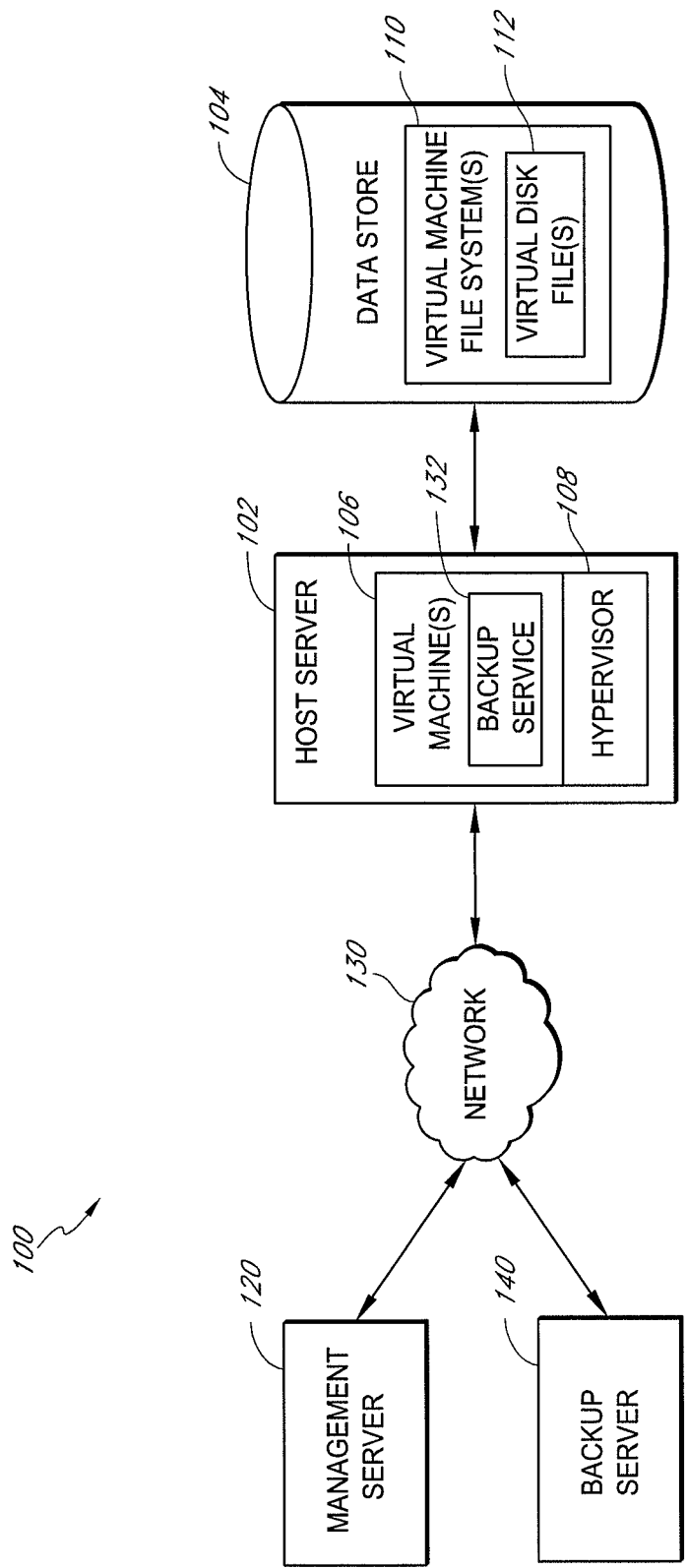
FIG. 1 illustrates an embodiment of a system for performing backup operations in a virtual computing environment.

FIG. 1 depicts an embodiment of a system 100 for performing backup operations in a virtual computing environment. In general, the backup system 100 provides a tool for backing up virtual machine disk files without backing up a significant amount of deleted or empty data. As such, in certain embodiments, the backup system 100 can perform backups faster and with less storage consumption than currently-available backup systems.

As shown in FIG. 1, the backup system 100 includes a host server 102 in communication with a data store 104. In certain embodiments, the host server 102 includes one or more computing devices configured to host one or more virtual machines 106 executing on top of a hypervisor 108. In certain embodiments, the hypervisor 108 decouples the physical hardware of the host server 102 from the operating system(s) of the virtual machine(s) 106. Such abstraction allows, for example, for multiple virtual machines 106 with different operating systems and applications to run in isolation or substantially in isolation on the same physical machine.

The hypervisor 108 includes a virtualization platform that allows for multiple operating systems to run on a host computer at the same time. For instance, the hypervisor 108 can include a thin piece of software that runs directly on top of the hardware platform of the host server 102 and that virtualizes resources of the machine (e.g., a native or "bare-metal" hypervisor). In such embodiments, the virtual machine(s) 106 can run, with their respective operating systems, on the hypervisor 108 without the need for a host operating system. Examples of such bare-metal hypervisors can include, but are not limited to, ESX SERVER by VMware, Inc. (Palo Alto, Calif.), XEN and XENSERVER by Citrix Systems, Inc. (Fort Lauderdale, Fla.), ORACLE VM by Oracle Corporation (Redwood City, Calif.), HYPER-V by Microsoft Corporation (Redmond, Wash.), VIRTUOZZO by Parallels, Inc. (Switzerland), or the like.

In yet other embodiments, the host server 102 can include a hosted architecture in which the hypervisor 108 runs within a host operating system environment. In such embodiments, the hypervisor 108 can rely on the host operating system for device support and/or physical resource management. Examples of such hosted hypervisors can include, but are not limited to, VMWARE WORKSTATION and VMWARE SERVER by VMware, Inc., VIRTUAL SERVER by Microsoft Corporation, PARALLELS WORKSTATION by Parallels, Inc., or the like.

In certain embodiments, each virtual machine 106 includes a guest operating system and associated applications. In such embodiments, the virtual machine 106 accesses the resources (e.g., privileged resources) of the host server 102 through the hypervisor 108. At least some of the machines can also include a backup service 132 in certain embodiments, which can assist with backup operations, as described below.

The host server 102 communicates with the data store 104 to access data stored in one or more virtual machine files. For instance, the data store 104 can include one or more virtual machine file systems 110 that maintain virtual disk files or virtual machine images for some or all of the virtual machines 106 on the host server 102. In certain embodiments, the virtual machine file system 110 includes a VMWARE VMFS cluster file system provided by VMware, Inc. In such embodiments, the VMFS cluster file system enables multiple host servers (e.g., with installations of ESX server) to have concurrent access to the same virtual machine storage and provides on-disk distributed locking to ensure that the same virtual machine is not powered on by multiple servers at the same time. In other embodiments, the virtual machine file system 110 is stored on the host server 102 instead of in a separate data store.

The data store 104 can include any physical or logical storage for holding virtual machine files. The data store 104 can exist on a physical storage resource, including one or more of the following: local disks (e.g., local small computer system interface (SCSI) disks of the host server 102), a disk array, a storage area network (SAN) (e.g., fiber channel), an iSCSI disk area, network attached storage (NAS) arrays, network file system (NFS), or the like. In certain embodiments, the virtual machine(s) 106 uses a virtual disk file 112 or virtual machine image residing on the data store 104 to store its operating system, program files, and other data associated with its activities.

The backup system 100 further includes a management server 120 in communication with the host server 102 over a network 130. In certain embodiments, the management server 120 includes one or more computing devices. The management server 120 can coordinate the backup operations of the virtual machine disk files 112 through the host server 102. In one embodiment, the management server 120 causes the backup service 132 of the virtual machine 106 to perform certain backup operations. For example, the backup service 132 can perform shadow copy or snapshot operations, such as are described in U.S. application Ser. No. 12/182,364, filed Jul. 30, 2008, titled "Systems and Methods for Performing Backup Operations of a Virtual Machine," the disclosure of which is hereby incorporated by reference in its entirety. In addition, the backup system 100 can include additional features described in U.S. application Ser. No. 12/502,052, filed Jul. 13, 2009, titled "Backup Systems and Methods for a Virtual Computing Environment," the disclosure of which is hereby incorporated by reference in its entirety.

Advantageously, in certain embodiments, the management server 120 analyzes the virtual disk files 112 to identify the status of portions of the virtual disk files 112 to determine whether these portions include active, deleted, and/or zero data. The management server 120 can identify the status of these disk file portions efficiently by accessing metadata within the virtual disk file 112. The management server 120 can then initiate a backup of the active portions of the virtual disk file 112.

The management server 120 analyzes the virtual disk file 112 in certain embodiments outside of the virtual machine 106, for example, outside of a guest operating system of the virtual machine 106. The management server 120 can therefore reduce the impact of backup operations on the virtual machine 106. Alternatively, in certain embodiments, a component operating within the virtual machine 106 can perform this analysis, such as an application executing in the virtual machine 106. For instance, the management server 120 can inject a lightweight binary file into the virtual machine 106 executing on the host. On WINDOWS systems, for example, the management server 120 can inject the binary using Windows Management Instrumentation (WMI) features. The binary file can then analyze the virtual disk file 112. Additional features of the management server 120 are described in greater detail below with respect to FIG. 2.

As further illustrated in FIG. 1, the backup system 100 includes a backup, or target, server 140 for storing backup files, such as a backup of one or more of the virtual disk files 112. As shown, the backup server 140 is coupled to the network 130 and can directly communicate with the management server 120. The management server 120 can cause backups of virtual disk files 112 to be stored in the backup server 140.

As shown, the network 130 provides a wired and/or wireless communication medium between the host server 102, the management server 120 and/or the backup server 140. In certain embodiments, the network 130 includes a local area network (LAN). In yet other embodiments, the network includes one or more of the following: Internet, intranet, wide area network (WAN), public network, combinations of the same or the like.

Although the backup system 100 has been described with reference to particular arrangements, other embodiments can comprise more or fewer components. For example, in certain embodiments, the backup system 100 can function without the backup server 140, and backup files can be stored to the data store 104 or a local storage device directly coupled to the management server 120 or host system 102.

In yet other embodiments, the host server 102 can comprise a plurality of servers in a clustered arrangement such that the computing and memory resources of the clustered servers are shared by one or more virtual machines 106. Moreover, in certain embodiments, the backup tool maintained by the management server 120 can instead reside on the host server 102 and/or the backup server 140.

Figure 2:
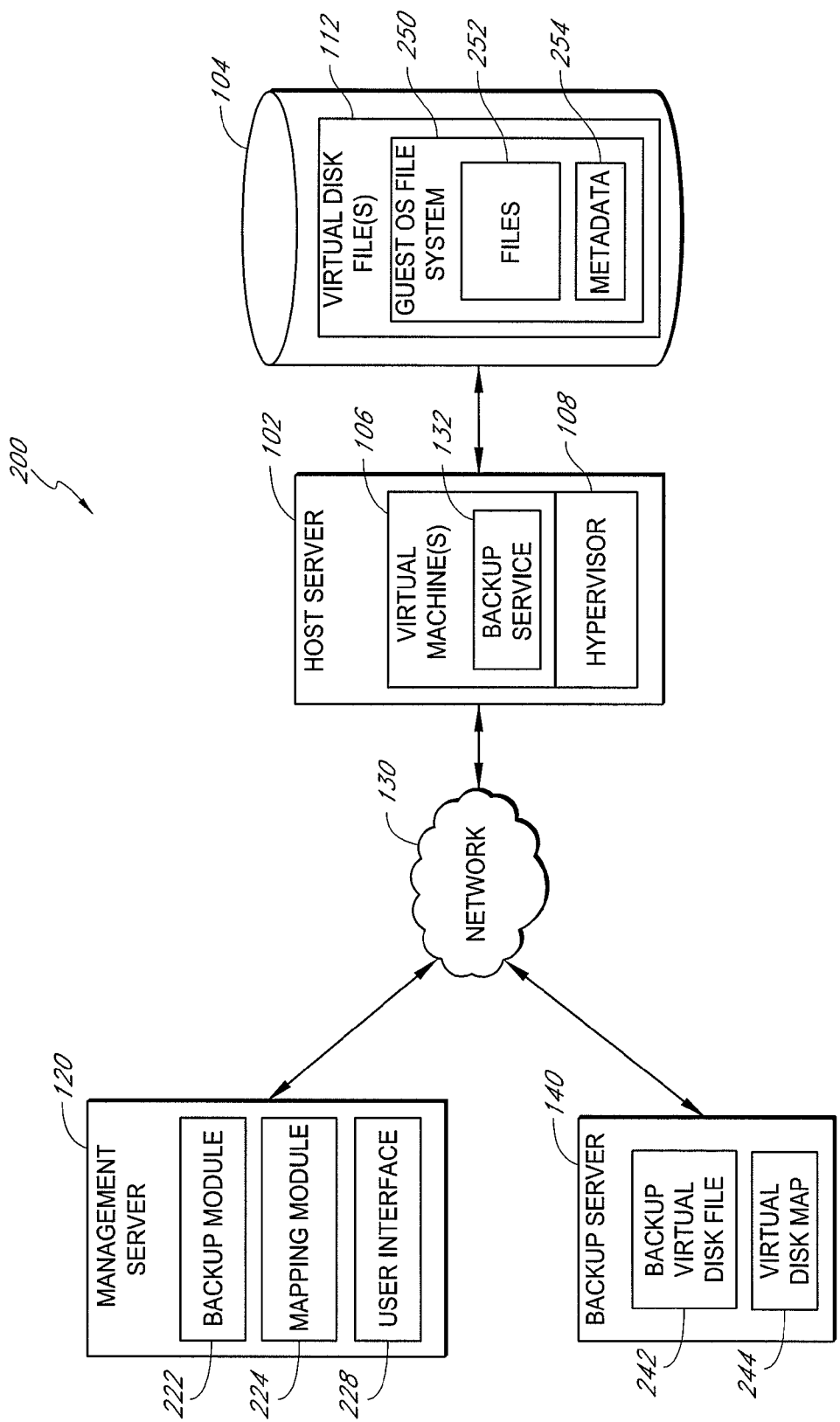
FIG. 2 illustrates an embodiment of another system for performing backup operations in a virtual computing environment.

FIG. 2 illustrates a more detailed embodiment of a backup system 200 for performing storage operations in a virtual computing environment. The backup system 200 includes the features of the backup system 100 of FIG. 1 and further includes additional features. For example, the backup system 200 can back up virtual machine disk files without backing up a significant amount of deleted or empty data.

In the depicted embodiment, the management server 120 includes a backup module 222, a mapping module 224, and a user interface module 228. Each of these modules can be implemented in hardware and/or software. In certain embodiments, the backup module 222 coordinates backup operations of virtual disk files 112 stored in the data store 104. The backup module 222 can perform, for example, full backups, differential backups, incremental backups, or the like. The backup module 222 can coordinate with the backup service 132 within the virtual machine 106 to perform virtual disk snapshots in the manner described in U.S. application Ser. No. 12/182,364, referred to above. However, in some embodiments, the backup module 222 performs backup operations without coordinating with a backup service inside the virtual machine 106.

The mapping module 224 can determine status information about a virtual disk file 112. In the context of VMWARE systems, for instance, the mapping module 224 can access a .VMDK virtual disk file 112. In one embodiment, the backup module 222 invokes the mapping module 224 prior to backing up the virtual disk file 112. Status information determined by the mapping module 224 can include information on which portions of the virtual disk file 112 include active or inactive data. Active data can include data that is currently used by the virtual machine 106. For example, active data can include non-deleted and non-zero data. In contrast, inactive data can include deleted data or zero (empty) data. Some guest operating systems merely mark data as deleted when a user deletes the data, rather than actually erasing the data from storage. Thus, the deleted data can include actual data that has been marked as deleted.

The mapping module 224 can determine the status information about the virtual disk file 112 by accessing a guest operating system file system 250 stored within the file 112. The file system 250 includes files 252, such as guest operating system files, application files, user documents, and so on. Metadata 254 in the file system 250 describes the logical structure of the files 252, including the locations of the files in a logical hierarchy such as a directory tree. In addition, the metadata 254 can specify the physical structure of the files 252, such as the locations of the files 252 in the virtual disk file 112, the size of the files 252, and so on.

Different guest operating systems can include different file systems. For example, many WINDOWS operating systems use the NTFS file system, whereas LINUX systems use a different file system. While file systems from different operating systems are implemented differently, most file systems share the common characteristic of using metadata to describe the structure of the files. In certain embodiments, the mapping module 224 can determine status information from many different types of files systems 250.

Advantageously, in certain embodiments, the mapping module 224 accesses the metadata 254 to determine the status information. Accessing the metadata 254 can be faster than scanning (or reading) some or all of the file system 250 to determine status information because the metadata 254 can include a summary or description of the status information. In one embodiment, the metadata 254 for a WINDOWS-based NTFS file system 250 can include a header file called a Master File Table (MFT). The MFT can be organized as a database table or tables, with each row in the table or tables representing one file. Data about the files 252 stored in the MFT can include information such as file permissions, ownership, size, location, and status of data blocks of the file. The mapping module 224 can therefore access the MFT to obtain the status information for portions of the file system. In contrast, the metadata 254 in many LINUX and UNIX-based systems include an inode or vnode for some or all of the files. The inodes (or vnodes) are data structures that can include file permissions, ownership, size, location, and status of data blocks of the file. Thus, in LINUX or UNIX-based systems, the mapping module 224 can access the inodes or vnodes to obtain status information for portions of the file system.

Different implementations of the mapping module 224 can analyze the metadata 254 at different levels of granularity. In one implementation, the mapping module 224 determines the status of storage blocks of the file system 250 from the metadata 254. In another embodiment, the mapping module 224 determines the status of the files 252 of the file system 250. In yet another embodiment, the mapping module 224 determines the status of directories of the file system 250. For ease of illustration, the remainder of this specification will refer to determining the status of blocks in the file system 250. However, it should be understood that the various features described herein can apply to any type of metadata mapped by the mapping module 224.

Advantageously, in certain embodiments, the mapping module 224 can store the status information about blocks (or other storage units) in a virtual disk map 244 on the backup server 140 or on another device (e.g., in a memory). The virtual disk map 244 can be a data structure or the like that includes some indication of the status of some or all of the blocks in the file system 250. The virtual disk map 244 can advantageously consume far less storage than the data in the virtual disk file 112 because the map 244 represents the data but does not include the actual data. For example, the virtual disk map 244 can be a bitmap, a bytemap, or some other data structure. Various features of the virtual disk map 244 will be described in greater detail below with respect to FIGS. 4 and 5.

When backing up the virtual disk file 112, the backup module 222 can consult the virtual disk map 244 to determine which blocks of the file system 250 are active or inactive. The backup module 222 can then save the active blocks in a backup virtual disk file 242. An embodiment of a backup process used by the backup module 222 is described below with respect to FIG. 3.

The user interface module 228 of the management server 120 can provide functionality for users to control settings of the backup module 222 and/or the mapping module 224. For instance, the user interface module 228 can provide a scheduling user interface that allows an administrator to schedule backups of the virtual disk file 112. In one embodiment, the user interface module 228 also provides an interface to enable or disable the functions of the mapping module 224. An administrator may wish to disable the mapping module 224 because in some embodiments undelete operations cannot be performed on the backup virtual disk file 242 when deleted blocks are not saved in the file 242. The user interface module 228 can also allow an administrator to enable some functionality of the mapping module 224 while disabling others. For example, a user interface might allow an administrator to enable zero block removal to reduce backup size while disabling deleted block removal to allow for undelete operations.

III. Backup Process

Figure 3:
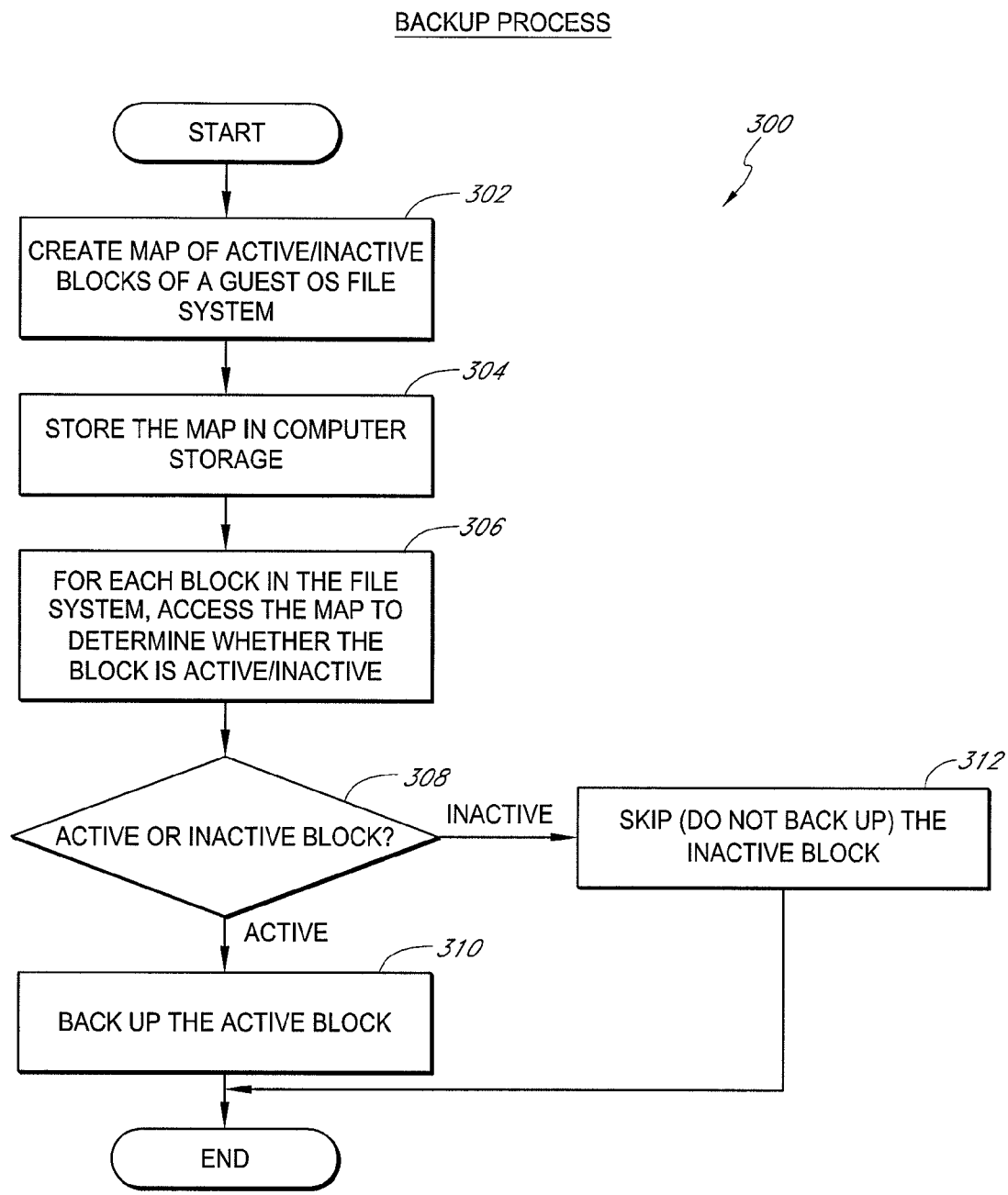
FIG. 3 illustrates an embodiment of a backup process.

FIG. 3 illustrates an embodiment of a backup process 300 for efficiently backing up a virtual machine image. The backup process 300 can be implemented by the systems 100 or 200 described above. For example, the backup process 300 can be implemented by the management server 120, or more specifically, the backup and mapping modules 222, 224 of the management server 120. In certain embodiments, the backup process 300 performs virtual machine image backups more efficiently than currently-available backup solutions.

At state 302, a map of active and/or inactive blocks of a guest operating system file system are created. The map created can be the virtual disk map 244 described above with respect to FIG. 2 and can be created by the mapping module 224. The map can include an indication of which blocks are active, which blocks are inactive, or both. Further, inactive blocks can be broken down to include deleted blocks and zero blocks, which can be separately indicated in the map. The map is stored in computer storage at state 304, for example, by the mapping module 224. The mapping module 224 can persist the map or can store the map in memory (see FIG. 4).

For some or all of the blocks in the file system, at state 306, the map is accessed to determine whether the block or blocks are active or inactive. In one embodiment, state 306 is implemented by the backup module 222 at the start of a backup operation. At decision state 308, it is determined whether the block is active or inactive. The backup module 222 can access a value for the block stored in the map, for instance, which indicates whether the block is active or inactive. If the block is active, the block is backed up at state 310. Otherwise, the block is skipped (not backed up) at state 312. In another embodiment, the active blocks are backed up at one time, for example, as one backup operation, instead of backing up individual active blocks.

To illustrate the potential benefits of the backup process 300, an example virtual machine image might include 70 GB of zero blocks, 20 GB of active blocks, and 10 GB of deleted blocks. A traditional backup process without zero or deleted block handling would create a backup file of 70+20+10=100 GB (or somewhat smaller with file compression). With zero handling, the backup file would be 20+10=30 GB (or smaller with compression). However, applying the backup process 300, the backup file size would be 20 GB because both zeros and deleted blocks are skipped by the backup process 300. This file can also be compressed to further reduce storage consumption.

In addition, the backup process 300 can still provide benefits even if the example above were changed to include 70 GB of zero blocks, 20 GB of active blocks, and 0 GB of deleted blocks. While the size of the backup file would be the same or approximately the same whether using zero handling or the process 300, the speed of the backup process 300 can be greater than a zero handling process. The speed increase can be due to the process 300 determining which blocks are zeros more quickly than a traditional zero handling process, which scans all the blocks to determine where the zero blocks are. Techniques for rapidly detecting zeros, deleted blocks, and active blocks are described below more fully with respect to FIG. 4.

IV. Block Mapping

Figure 4:
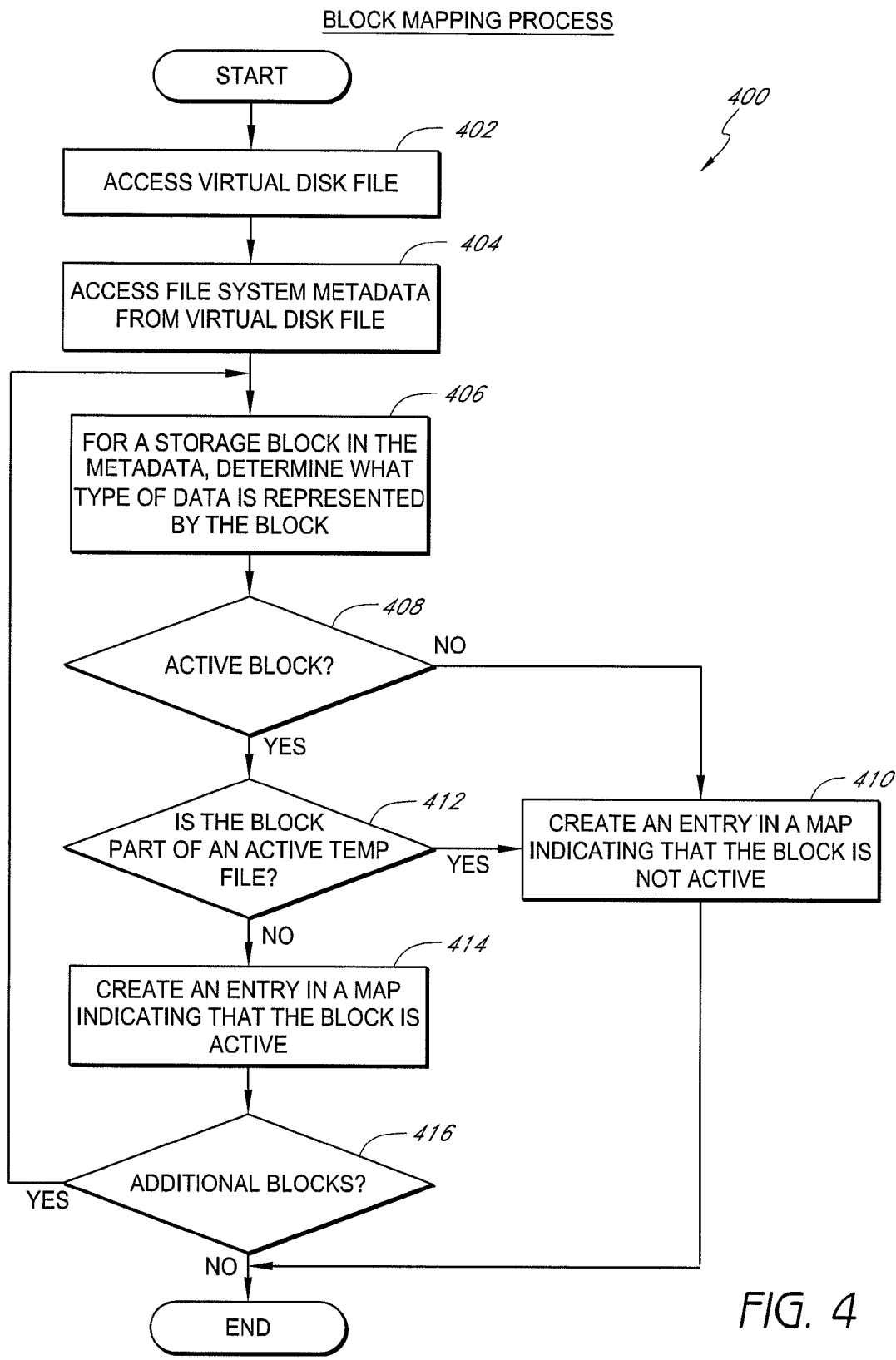
FIG. 4 illustrates an embodiment of a block mapping process.

FIG. 4 illustrates an embodiment of a block mapping process 400 for identifying active and inactive blocks in a virtual machine image. The block mapping process 400 can be implemented by the systems 100 or 200 described above. For example, the block mapping process 400 can be implemented by the management server 120, or more specifically, the mapping module 224 of the management server 120. In certain embodiments, the mapping module 224 efficiently maps block status to a map data structure.

At state 402, a virtual disk file is accessed, and file system data is accessed from the virtual disk file at state 404. In one embodiment, the mapping module 224 directly accesses the metadata in the virtual disk file. For example, the mapping module 224 can access a Master Boot Record (MBR) in the virtual disk file, which is typically in the same location for most virtual disk files (such as within the first several bytes of the file). The mapping module 224 can determine the location of the file system data from the MBR. For NTFS file systems, for example, the MFT metadata file is at a certain offset in the MBR. Thus, once the mapping module 224 has located the file system, the mapping module 224 can access the MFT at the expected location.

In another embodiment, the mapping module 224 indirectly obtains access to the virtual disk file by calling an application programming interface (API) provided, for example, by a virtual machine vendor. For example, in VMWARE virtual machine environments, such an API exists for accessing virtual disk file data. The API can further include functionality for accessing the contents of the virtual disk file, including the file system metadata. This indirect approach to accessing metadata can be useful when the mapping module 224 is implemented in a different file system than the virtual disk file. For instance, if the mapping module 224 is implemented in a WINDOWS file system but the virtual disk file is formatted for the LINUX file system, an API can allow the mapping module 224 to read the LINUX-formatted virtual disk file.

At state 406, for a storage block in the metadata, it is determined what type of data is represented by the block. As described above, the mapping module 224 can determine whether a block contains active, deleted, or zero data. At decision state 406, it is determined whether the block is active. In one embodiment, an active block is any block that contains a portion of active data, however small. Many file systems use a standard block size for partitioning data storage, such as 4 kB. A file system might mark a 4 kB (or other size) block as active even if that active data in the block includes a tiny fraction of the full block size. Thus, even though the backup processes described herein can avoid backing up a substantial amount of deleted data, some deleted data may still be saved in a backup process.

In some embodiments, the mapping module 224 maps a plurality of file system blocks to a single status bit, byte, or the like. For instance, instead of mapping each 4 kB block in a file system to a single status bit (e.g., representing active or deleted), the mapping module 224 can map 256 file system blocks to a single status bit if any of the 256 blocks have active data. If each of the file system blocks is 4 kB large, the mapping module 224 can therefore equivalently map 1 MB of file system data (256×4 kB) to a single status bit. In another embodiment, the mapping module 224 can map 64 file system blocks to a single status bit if any of the 64 blocks have active data. If each of the file system blocks is 4 kB large, the mapping module 224 can then equivalently map 256 kB of file system data (64×4 kB) to a single status bit. Other mapping sizes can be chosen.

In one embodiment, the mapping size is chosen to optimize or otherwise improve the performance of compression algorithms employed by the backup module 222 when compressing the backup virtual disk file 242. Some compression algorithms, when used as an in-line process (e.g., in-line with a backup process) take less processing time when using smaller mapping sizes, whereas others take less time when using larger mapping sizes. Using a larger mapping size can result in storing more deleted data at the possible beneficial tradeoff of reducing compression processing time. The mapping module 224 can automatically adjust the mapping size used based at least partly on the compression algorithm selected.

If the block is not active, an entry is created in a map to indicate that the block is not active at state 410. Otherwise, it is further determined at decision state 412 whether the block is part of an active temporary file. If the block is part of an active temporary file, the block is active because it does not contain deleted data. However, to save backup storage space, in certain embodiments, an entry is created in a map to indicate that the temporary file block is not active at state 410. Examples of temporary files include virtual memory files (e.g., pagefile.sys in WINDOWS), system sleep or hibernate state files (such as hiberfile.sys in WINDOWS), temporary Internet files, and the like. An option to skip (e.g., mark as inactive) or to not skip temporary files can be provided by the user interface module 228 described above.

If the block is not part of a temporary file, an entry is created in the map indicating that the block is active at state 414. It is then determined whether additional blocks are left in the metadata to analyze at decision state 416. If so, the block mapping process 400 loops back to state 406. Otherwise, the block mapping process 400 ends.

The mapping process 400 can be used in conjunction with other systems that provide zero handling. For instance, the mapping process 400 can be applied as a filter to the output of a zero handling system. An example zero handling system provided by VMWARE is the Change Block Tracking (CBT) system. In one embodiment, the backup module 222 can use the CBT system to obtain information about zero blocks. The CBT can perform a full file system scan to identify and map the zero blocks. Thereafter, the mapping module 224 can apply the process 400 to identify deleted blocks in the machine image. The mapping module 224 can modify the map provided by the CBT system to indicate the locations of deleted blocks.

It should be noted that in certain embodiments, the mapping module 224 stores the map in memory instead of persisting the map to disk storage. In another embodiment, the mapping module 224 does not create a map data structure. Instead, the mapping module 224 can determine whether a block is active, deleted, and/or zero and provide an indication of this determination to the backup module 222 (e.g., through memory). The backup module 222 can then back up the referenced block. The mapping module 224 can then examine the next block, followed by the backup module 222 backing up the next block, and so on. Thus, the determination of active, deleted, and/or zero blocks can be performed in-line with backup operations.

Moreover, in certain embodiments, the mapping module 224 can map the virtual disk file 112 from outside of the virtual machine 106, for example, outside of a guest operating system of the virtual machine 106. The mapping module 224 can therefore reduce the impact of mapping operations on the virtual machine 106. The mapping module 224 and/or the backup module 222 can also facilitate obtaining a more complete picture of the virtual disk file 112 because the mapping module 224 and/or the backup module 222 can execute outside of the virtual machine. In addition, in some embodiments, the backup module 222 performs backup operations from outside of the virtual machine 106. In other embodiments, the mapping module 224 is a process running in the virtual machine and therefore maps the file system from within the virtual machine 106. In one such embodiment, the mapping module 224 can access an operating system API to determine the location of the metadata and access the metadata. The backup module 222 can also be a process running in the virtual machine 106 (e.g., as a volume shadow copy service). In another embodiment, the mapping module 224 can run inside of the virtual machine 106 while the backup module 224 runs outside, or vice versa.

Figure 5:
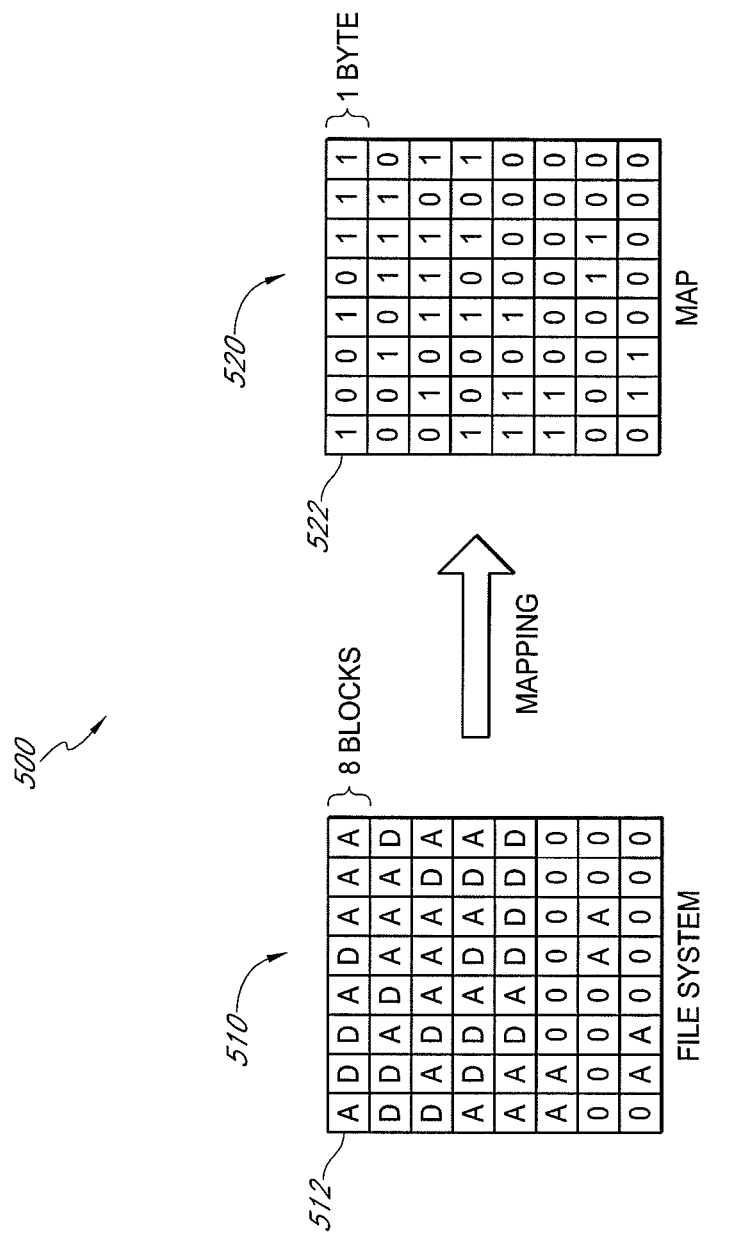
FIG. 5 illustrates an example mapping that can be performed by the block mapping process of FIG. 4.

FIG. 5 illustrates a conceptual example of a mapping 500 that can be performed by the block mapping process 400 of FIG. 4. A portion of a file system 510 is represented by a plurality of blocks 512. The blocks 512 are marked with an 'A', 'D', or '0' character to represent active, deleted, or zero (empty) data, respectively. Some or all of the blocks can represent a particular size or chunk of data; 1 Mb block sizes are used in some NTFS file system implementations, for example.

Some or all of the blocks 512 can be mapped by the block mapping process 400 to a corresponding unit 522 of a map 520. In the depicted embodiment, the map 520 is a bitmap, and each unit 522 of the map represents one bit of storage. Thus, the block mapping process 400 can map the file system blocks 512 to bit units 522 ("bits 522") in the map 520. As each unit 522 is one bit large in some embodiments, the map 520 can consume far less memory than the file system 510 and therefore can be an efficient way to store block status information. In certain embodiments, the map 520 can also be compressed to further reduce its storage impact.

In the depicted embodiment, the bits 522 in the map 520 include a '1' to represent active blocks 512 and a '0' to represent inactive blocks, including both deleted and zero blocks 512. Of course, the roles of the '1' and '0' characters can be reversed or other symbols can be used to represent active and inactive blocks. In another embodiment, a third symbol can be used to distinguish deleted and zero blocks 512. The bits 522 can be packed into bytes or octets so as to be addressable in most storage systems. In other embodiments, a single byte or other unit of storage can be used to represent each block 512.

Data structures other than maps can be used to store block 512 status information. For example, database tables, lists, arrays, or other structures can be used to store status information. Many other storage options will be apparent from this disclosure.

V. Restore

Figure 6:
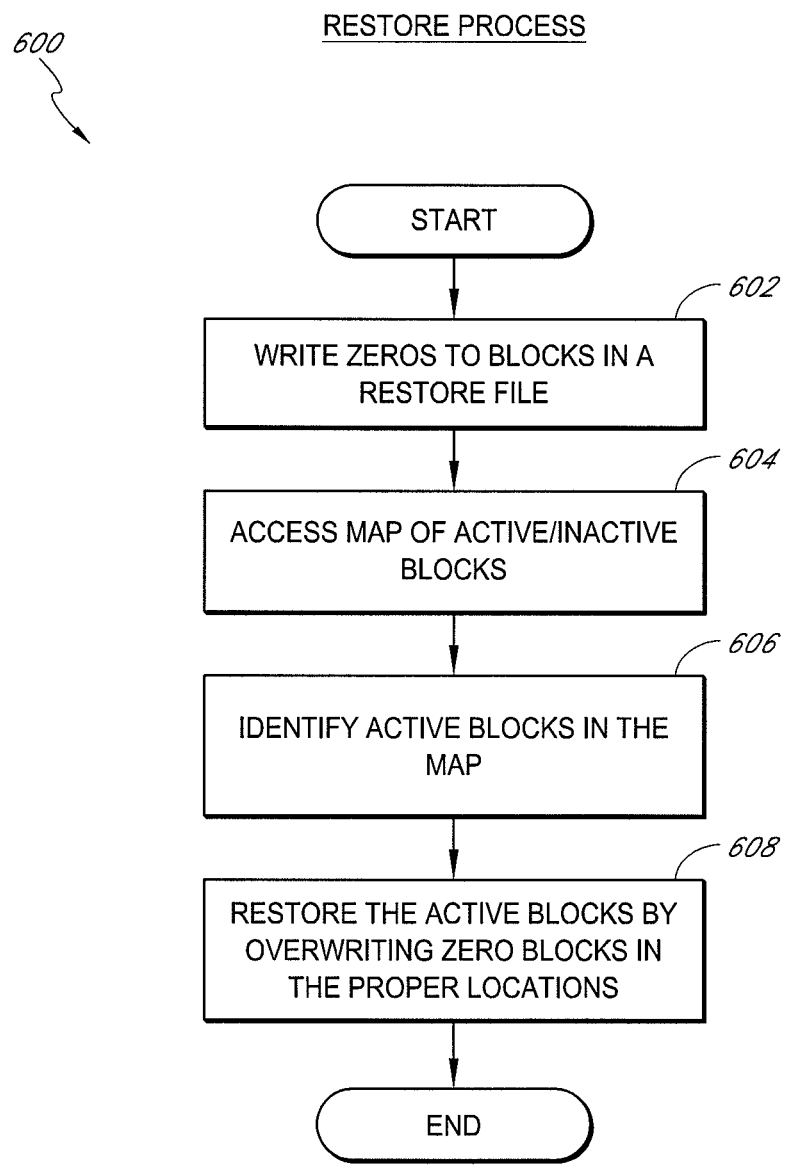
FIG. 6 illustrates an embodiment of a restore process.

FIG. 6 illustrates an embodiment of a restore process 600 for restoring a virtual machine image. Like the processes 300, 400 described above, the restore process 600 can be implemented by the systems 100 or 200. For example, the restore process 600 can be implemented by the management server 120, or more specifically, the backup module 222 of the management server 120. In certain embodiments, the backup module 222 accesses the virtual disk map 244 created by the mapping module 224 to rapidly restore the backup virtual disk file 242.

At state 602, zeros are written to blocks in a restore file to provide a clean file when restoring a virtual machine image. Advantageously, in certain embodiments, these zeros can be written at disk subsystem speeds and can be faster than restoring zero blocks over a network.

A map of active and inactive blocks is accessed at state 604, for example, from the backup server 140. Active blocks are identified in the map at state 606. The active blocks are then restored by overwriting the zero blocks in the proper locations at state 608. In certain embodiments, state 602 can be omitted from the restore process 600.

VI. Terminology

Depending on the embodiment, certain acts, events, or functions of any of the algorithms described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for backing up a virtual machine image, the system comprising:
   a computer system comprising computer hardware, the computer system programmed to implement:
   a mapping module configured to:
   access a virtual machine image comprising a file system of a guest operating system of a virtual machine to obtain metadata about the file system, the metadata stored within the virtual machine image, the metadata describing logical or physical structure of the file system, wherein the mapping module is configured to obtain the metadata from the virtual machine image without executing inside the virtual machine,
   obtain from the metadata an indication of status of blocks in the file system,
   store the status of at least some of the blocks in a map data structure, wherein the map data structure is stored outside the virtual machine image; and
   a backup module located outside the virtual machine image and configured to back up active blocks of the virtual machine image by at least:
   accessing the map data structure to determine the status of the at least some of the blocks, wherein a block in the file system is determined to have an active status if the block includes non-zero data or non-deleted data, wherein a block in the file system is not determined to have an active status if the block includes deleted data;
   wherein, for purposes of the accessing, data that has been marked by the guest operating system as deleted but that has not been erased from storage is considered deleted data, and
   backing up the blocks that have an active status while not backing up the blocks that do not have an active status, to thereby reduce backup storage consumption and backup time.

2. The system of claim 1, wherein the mapping module is further configured to store the status of at least some of the blocks in the map data structure by storing a bit representing the status for each of the blocks.

3. The system of claim 1, wherein the status for a given one of the blocks is selected from the group consisting of active and deleted.

4. The system of claim 1, wherein the status for a given one of the blocks is selected from the group consisting of active, deleted, and zero.

5. The system of claim 1, wherein the status for a given one of the blocks is selected from the group consisting of active and inactive.

6. The system of claim 1, wherein the map data structure comprises a bitmap.

7. The system of claim 1, wherein the metadata comprises a Master File Table.

8. The system of claim 1, wherein the metadata comprises one or more inodes.

9. A method of backing up a virtual machine image, the method comprising:

by a computer system comprising computer hardware:

accessing a virtual machine image comprising a file system of a guest operating system of a virtual machine executing on a host server;

identifying deleted blocks of the file system without reading the deleted blocks, said identifying comprising accessing metadata included within the file system to determine which blocks of the file system are the deleted blocks;

wherein the deleted blocks comprise blocks that have been marked as deleted by the guest operating system but that have not been erased from storage; and backing up the virtual machine image by at least storing active blocks of the file system in computer storage while not backing up the deleted blocks.

10. The method of claim 9, wherein said accessing the virtual machine image comprises using an application programming interface (API) to access the virtual machine image.

11. The method of claim 10, further comprising using the API to access the metadata in the file system.

12. The method of claim 9, wherein said accessing the metadata of the file system comprises searching the virtual machine image at a predetermined location to identify the metadata.

13. The method of claim 9, further comprising identifying temporary blocks associated with temporary files of the file system.

14. The method of claim 13, wherein said backing up the virtual machine image further comprises skipping the temporary blocks.

15. The method of claim 9, wherein said identifying the deleted blocks is performed by a component executing outside of the virtual machine.

16. A non-transitory computer-readable storage medium comprising computer-executable instructions configured to implement a method of backing up a virtual machine image, the method comprising:

initiating a backup of a virtual machine configured to execute on a host server, the virtual machine comprising a guest operating system and a file system associated with the guest operating system, the file system including active blocks that are in use by the virtual machine and deleted blocks, the deleted blocks comprising blocks that are marked as deleted by the guest operating system but are not erased from storage;

identifying the deleted blocks and the active blocks of the file system without scanning all blocks of the file system, said identifying being performed by a component executing outside of the virtual machine; and backing up the active blocks of the file system while not backing up the deleted blocks of the file system.

17. The non-transitory computer-readable storage medium of claim 16, wherein said identifying the one or more of deleted blocks and active blocks comprises storing an indication of deleted status of the deleted blocks in a data structure stored outside of the virtual machine.

18. The non-transitory computer-readable storage medium of claim 16, wherein said identifying the one or more of deleted blocks and active blocks comprises storing an indication of active status of the active blocks in a data structure.

19. The non-transitory computer-readable storage medium of claim 16, further comprising restoring the virtual machine image subsequent to said backing up, said restoring comprising writing zero blocks to a restore file.

20. The non-transitory computer-readable storage medium of claim 19, wherein said restoring further comprises overwriting at least some of the zero blocks with the active blocks.

* * * * *